United States Patent
Robberg et al.

[11] Patent Number: 5,129,019
[45] Date of Patent: Jul. 7, 1992

[54] METHOD OF MANUFACTURING A FUSED-FIBER OPTICAL COUPLER

[75] Inventors: Rolf Robberg, Schwieberdingen; Friedemann Mohr, Renningen, both of Fed. Rep. of Germany

[73] Assignee: Alcatel N.V., Amsterdam, Netherlands

[21] Appl. No.: 580,921

[22] Filed: Sep. 10, 1990

[30] Foreign Application Priority Data

Sep. 8, 1989 [DE] Fed. Rep. of Germany ....... 3930029

[51] Int. Cl.⁵ .................................................. G02B 6/26
[52] U.S. Cl. ........................................... 385/42; 385/51
[58] Field of Search ............... 350/96.15, 96.16, 96.29, 350/96.30, 320; 385/42, 51

[56] References Cited

U.S. PATENT DOCUMENTS

| | | | |
|---|---|---|---|
| Re. 33,296 | 8/1990 | Stowe et al. | 350/320 |
| 4,360,248 | 11/1982 | Bicket et al. | 350/96.16 |
| 4,737,005 | 4/1988 | Burns et al. | 350/96.15 |
| 4,753,497 | 6/1988 | Fujii et al. | 350/96.15 |
| 4,756,589 | 7/1988 | Bricheno et al. | 350/96.15 |
| 4,801,185 | 1/1989 | Bricheno | 350/96.15 |
| 4,810,052 | 3/1989 | Fling | 350/96.16 |
| 4,906,068 | 3/1990 | Olson et al. | 350/96.30 |
| 4,932,740 | 6/1990 | Berkey et al. | 350/96.15 |
| 4,957,339 | 9/1990 | Fussgänger et al. | 350/96.15 |

FOREIGN PATENT DOCUMENTS 3716247 11/1988 Fed. Rep. of Germany .
84/04822 12/1984 PCT Int'l Appl. .

OTHER PUBLICATIONS

Yataki et al., Electronics Letters, 21(6), 14 Mar. 1985, "All-Fibre Polarising Beamsplitter", pp. 249-251.
Yokohama et al., Electronics Letters, 21(10), 9 May 1985, "Fibre-Optic Polarising Beam Splitter Employing Birefringent-Fibre Coupler", pp. 415-416.
T. Bricheno, et al., "Stable Low-Loss Single-Mode . . . ", Electronic Letters, Stevenage, GB, vol. 20, No. 6, 15 Mar. 84, pp. 230-232.
M. Eisenmann, et al., "Single-Mode Fused Biconical Couplers . . . ", Journal of Lightwave Tech., vol. 6, No. 1, NY, Jan. 1988, 113-119.

Primary Examiner—Frank Gonzalez
Attorney, Agent, or Firm—Christie, Parker & Hale

[57] ABSTRACT

The method consists of first splicing (FIG. 2) one short length of a single-mode fiber (3, 4) into each of the optical fibers (1, 2) of fibers lying parallel to each other (FIG. 1), then fusing the two spliced-in single-mode fibers (3, 4) together (FIG. 3) and pulling them to form a coupler (6) (FIG. 4), and then embedding the coupler (6) in a protective housing (7) up to points beyond the splices (5).

2 Claims, 1 Drawing Sheet

METHOD OF MANUFACTURING A FUSED-FIBER OPTICAL COUPLER

TECHNICAL FIELD

The invention relates to a fused-fiber coupler manufactured from nonbirefringent single-mode fibers, such as are used to interconnect optical fibers.

BACKGROUND ART

From PCT application WO 84/04822, a fused-fiber optical coupler is known which consists of two single-mode fibers welded together in parallel along a length in the centimeter range and drawn [pulled] to thereby form a coupler. The coupling region and the associated stripped fibers are placed in a housing. The fiber ends of the coupler are then spliced to a fiber of the communication line or to another electro-optic converter, for which reason the free ends of the coupler must be relatively long.

If such a coupler made of single-mode fibers is spliced to polarization-maintaining fibers, one of the optical axes must lie in the coupling plane (and the other must be perpendicular to the coupling plane), so that the degree of polarization (extinction) of the polarized light is retained. For this, the coupler fibers must be as short as possible to prevent depolarization of the light. This is very difficult to accomplish with the known coupler.

DISCLOSURE OF INVENTION

The object of the invention consists of producing a coupler from single-mode fibers which [coupler] can be manufactured cost-effectively and can be used in particular in connection with polarization-maintaining fibers.

The method of the invention includes first splicing one short length of a single-mode fiber into each of the optical fibers, then fusing the two spliced-in single-mode fibers together and pulling them to form a coupler, and then embedding the coupler in a protective housing up to points beyond the splices.

Preferably, if the optical fibers are polarization-maintaining optical fibers, the optical axes of the optical fibers are aligned, with one of the two optical axes lying in the plane of the coupler to be formed, and fixing the optical fibers in position; in that case, the spliced in fiber may be either a polarization-maintaining fiber, or a nonbirefringent fiber.

In particular, the advantages obtained with the manufacturing method according to the invention are that the single-mode fibers forming the coupler are very short, that the splicing of the polarization-maintaining optical fibers can be performed without difficulty in spite of the short length of the single-mode fibers, that—in the case of polarization-maintaining optical fibers—before splicing of the single-mode fibers, the optical axes of the polarization-maintaining optical fibers can be aligned with each other in the coupling plane, and that the coupler is embedded in a housing up to points beyond the spliced polarization-maintaining fibers in a stress-free manner and protected against environmental effects.

BRIEF DESCRIPTION OF DRAWINGS

Using one example, the method for manufacturing a coupler according to the invention is explained in detail in connection with the drawings, which show.

BEST MODE FOR PRACTICING THE INVENTION

FIGS. 1 through 4 show, schematically, four stages in the course of the manufacturing process of a coupler according to the invention. For the sake of clarity, representation of the usual protective coating of the actual waveguide, the waveguide being hereinafter referred to as the "fiber," is omitted. The stripping of the fibers, their preliminary handling, and the fusing into a coupler is sufficiently known and is also described in detail in the PCT application WO 84/04822 mentioned above.

Figure 1:
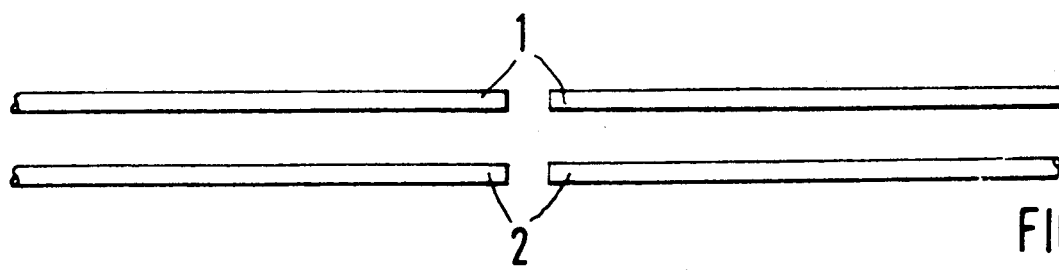
FIG. 1 two polarization-maintaining optical fibers, separated in the middle, lying parallel to each other, schematically.

FIG. 1 shows two parallel fibers which have been separated in the middle to permit insertion of a short piece of a single-mode fiber and which form the optical fibers 1 and 2.

When the fibers are polarization-maintaining fibers, i.e., fibers which are linearly birefringent in the lengthwise direction, before the single-mode fibers are spliced in, the optical axes of the optical fibers 1 and 2 must be aligned with each other pairwise in the plane of the coupler (6) to be formed (FIG. 4) in such a way that in each case one of the two optical axes of the fibers lies in the coupling plane. The optical fibers 1 and 2 are fixed in this position. When the optical fibers 1 and 2 are not birefringent, i.e., not polarization-maintaining fibers, such alignment is not necessary. In this case, the optical fibers 1 and 2 are only fixed in position for splicing.

Figure 2:
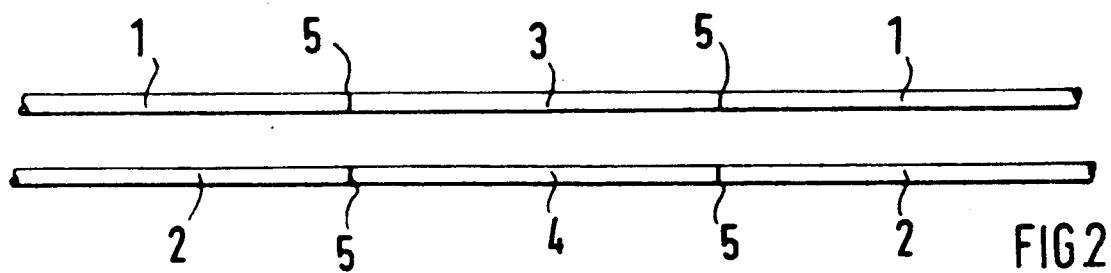
FIG. 2 the two polarization-maintaining fibers from FIG. 1, into each of which respectively is spliced a short piece of a single-mode fiber, schematically.
Figure 3:
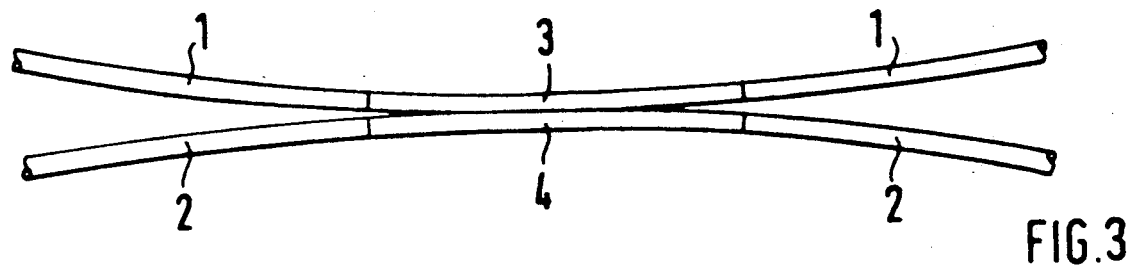
FIG. 3 the arrangement of the fibers from FIG. 2, at the time of fusion to form the coupler, schematically.
Figure 4:
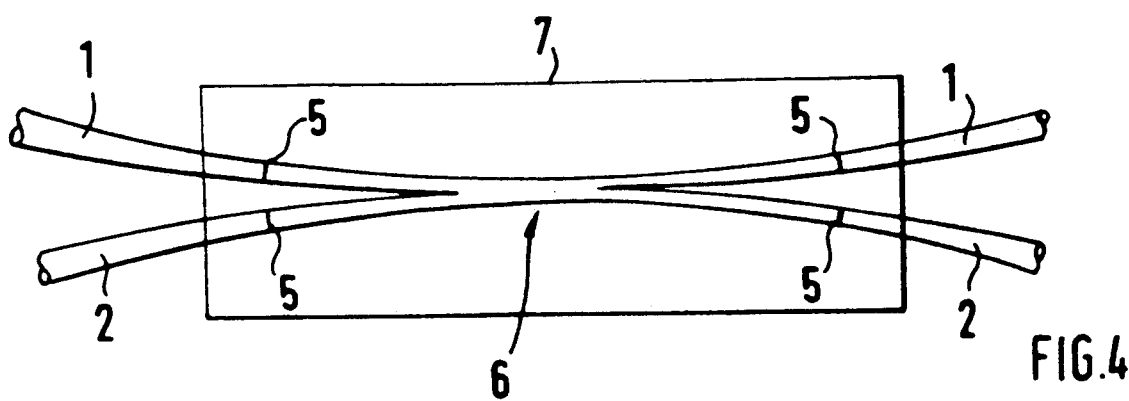
FIG. 4 the arrangement of the single-mode fibers from FIG. 3 after being fused and pulled to form a coupler, schematically.

The ends of the optical fibers 1 and 2 positioned in this manner are then separated far enough from each other that in each case an approximately 1 to 2 centimeter long piece of a single-mode fiber 3 or 4 can be spliced in between the optical fibers 1 or 2. This stage is shown in FIG. 2. Then, the two single-mode fibers 3 and 4 in the spliced condition are fused to each other in known fashion (FIG. 3) and pulled to form a coupler 6 (FIG. 4). Care is taken during this process to assure that the orientation of the optical fibers 1 and 2 to each other and to the coupling plane does not change.

The coupler 6 is then embedded in a stress-free manner and protected against environmental effects up to points beyond the splices 5 in a housing 7 represented here only by its outline.

Fused-fiber couplers can be made from various types of polarization-maintaining fibers, provided that one uses only fibers that do not have any increases in the refractive index outside the core area.

For low-loss couplers, fibers are preferred in which the stress-applying parts parallel to the fiber core which cause the birefringence are matched to the refractive index of the cladding glass.

We claim:

1. Method of manufacturing a fused-fiber coupler from at least two birefringent, polarization-maintaining single-mode fibers, for interconnecting at least two pairs of polarization-maintaining optical fibers, comprising the following steps:
a. aligning the optical axes of each of the polarization-maintaining optical fiber pairs, with a particular one of the two optical axes lying in the plane of the coupler to be formed. and fixing the optical fiber pairs in position with the opposing ends of each of the pairs separated by a predetermined short distance;
b. splicing a respective short length of a birefringent polarization-maintaining single-mode fiber between the opposing ends of each of the optical fiber pairs;
c. fusing the spliced-in single-mode fibers together and drawing them to form a coupler, and
d. embedding the coupler in a housing up to points beyond the splices in a stress-free manner.

2. Fused-fiber coupler manufactured by a method as claimed in claim 1 wherein the single-mode fibers forming the coupler proper have a length of 1 to 2 cm.

* * * * *